United States Patent [19]

Ziegler

[11] Patent Number: 5,376,989
[45] Date of Patent: Dec. 27, 1994

[54] ALIGNABLE NEGATIVE STAGE FOR A PHOTOGRAPHIC ENLARGER

[76] Inventor: William R. Ziegler, 417 Shirley Way, Menlo Park, Calif. 94025

[21] Appl. No.: 23,889
[22] Filed: Feb. 26, 1993
[51] Int. Cl.⁵ ............................................. G03B 27/62
[52] U.S. Cl. ........................................................ 355/75
[58] Field of Search ........................................... 355/75

[56] References Cited

U.S. PATENT DOCUMENTS

| | | | |
|---|---|---|---|
| 2,153,159 | 4/1939 | Schubert | 355/75 |
| 4,015,903 | 4/1977 | Zimmet et al. | 355/75 |
| 4,161,365 | 7/1979 | Anderson et al. | 355/75 |
| 4,965,631 | 10/1990 | Ozawa | 355/75 |

*Primary Examiner*—Monroe H. Hayes
*Attorney, Agent, or Firm*—R. Russel Austin

[57] ABSTRACT

A negative stage comprises a generally flat lower platform and a generally flat upper platform, each of the platforms includes an aperture for allowing passage of light through the platform from a light source in the enlarger.

The platforms are aligned in a face-to-face relationship with the apertures generally in alignment. The platforms are spaced-apart by at least three adjustable support-members extendable in a direction generally perpendicular to the platforms for adjusting spacing and alignment of the platforms. In one embodiment The upper platform is retained in contact with lower platform by spring loaded plungers. The spring loaded retaining arrangement allows relative movement between the platforms for alignment while still retaining the platforms firmly in contact with the support-members.

A light-baffle arrangement prevents light leakage between the platforms.

11 Claims, 7 Drawing Sheets

ALIGNABLE NEGATIVE STAGE FOR A PHOTOGRAPHIC ENLARGER

BACKGROUND OF THE INVENTION

The present invention relates in general to photographic enlarger apparatus. In particular, it relates to an alignable negative stage for a photographic enlarger.

In making high quality photographic prints or enlargements using a photographic enlarger, highest quality for the prints or enlargements is best achieved when a negative being printed is accurately aligned, i.e., parallel with, the plane of an enlarging lens in the enlarger, and parallel with the plane of paper receiving a projected image of the negative.

Commercially produced photographic enlargers are generally not supplied with alignment devices. It is frequently assumed by an enlarger user that necessary planes in the enlarger are aligned by the enlarger's manufacturer. A user generally adjusts only the enlarger's focus during use. This is generally accomplished by closely scrutinizing the projected image from the negative being enlarged, and adjusting a focus control until the sharpest overall image is obtained.

It is now possible to obtain, commercially, optical apparatus for precisely aligning principal planes of a photographic enlarger, such as the negative plane and the lens plane. One such apparatus is discussed in U.S. Pat. No. 5,075,862, which discloses a optical device which may be attached to one principal plane, and is cooperative with a mirror attached to another principal plane. A user looks through the optical device and adjusts the appropriate planes until a series of concentric circles is observed, indicating that the planes are parallel. This allows the planes to be fine aligned with a high degree of accuracy.

While this alignment operation may appear from the description to be relatively easy, it is in fact complicated severely by the fact that most commercial enlargers are constructed such that their principal planes are not readily adjustable. Generally, alignment of the planes may only be accomplished, at best, by loosening and re-tightening screws that are used to assemble and coarse-align the enlarger at the manufacturer's plant, or, at worst, by forcefully twisting or bending structural components of the enlarger.

It is not uncommon during enlarger operations to hold photographic paper, for receiving the projected image from the enlarger, on a platform or easel which is placed in position on an enlarger base. This easel may be aligned easily by means of shims or the like, or by adjustable feet attached thereto. An easel is generally heavy and rigid and, once aligned by any of the suggested methods, will remain firmly in position on the enlarger base under its own weight.

A particularly useful addition to an enlarger, either as an accessory or an integral component, would be a fine alignable negative stage. Given the availability of such a stage, at least two principle planes, i.e. the negative plane and the paper plane would be easily fine alignable and these two planes would be readily fine alignable with the lens plane whether or not the lens plane was alignable. Generally it is not.

SUMMARY OF THE INVENTION

It is an object of the present invention to provide an alignable negative stage for a photographic enlarger.

It is another object of the present invention to provide an alignable negative stage which may be used as an accessory with an existing enlarger, or incorporated in an enlarger as an integral component thereof.

It is a further object of the present invention to provide an alignable negative stage which may be useable with optical apparatus designed to facilitate accurate enlarger alignment.

The above and other objects are accomplished by providing, in one embodiment of the invention a negative stage comprising a generally flat lower platform and a generally flat upper platform, each of the platforms having an aperture therein for allowing passage of light therethrough from a light source in the enlarger.

The platforms are aligned in a face-to-face relationship, with the apertures therein generally in alignment. The platforms are spaced apart by at least three support-members, at least two thereof are extendable in a direction generally perpendicular to the platforms for adjusting relative spacing and alignment of the platforms. Means are provided for maintaining the platforms in contact with the support-members.

Preferably, the negative stage includes light-baffle means arranged around the apertures in the platforms and extending between the platforms for preventing leakage of light therebetween.

In a preferred embodiment of the invention, the platforms are each generally rectangular and of about the same rectangular dimensions. Each of the platforms has two opposite generally straight sides, and first and second ends. Three support-members are provided by three adjusting screws extending generally perpendicularly through the lower platform via mating threaded apertures therein. The three adjusting screws are arranged such that two thereof are proximate the first end of the lower platform, and one thereof is proximate the second end of the lower platform.

Preferably, spring loading means are provided for maintaining the platforms in contact with the support means. A preferred spring loading means includes four shafts, each thereof having first and second ends. Each of the shafts is attached at the first end thereof to the upper platform and extends freely through the lower platform via a corresponding aperture therein, such that a lower portion of each shaft extends below the lower platform. Each lower portion of each shaft has a coil spring arranged axially therearound, and means are provide at the second end of each shaft for maintaining the coil spring in compression against the lower platform.

The above-described preferred embodiment of the negative stage of the present invention is preferably installed in the enlarger with the first end of the lower platform facing a user. Thus installed, two adjusting screws are easily accessible to the user and may be simultaneously adjusted, for simultaneous aligning the stage in two orthogonally opposed inclinations.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
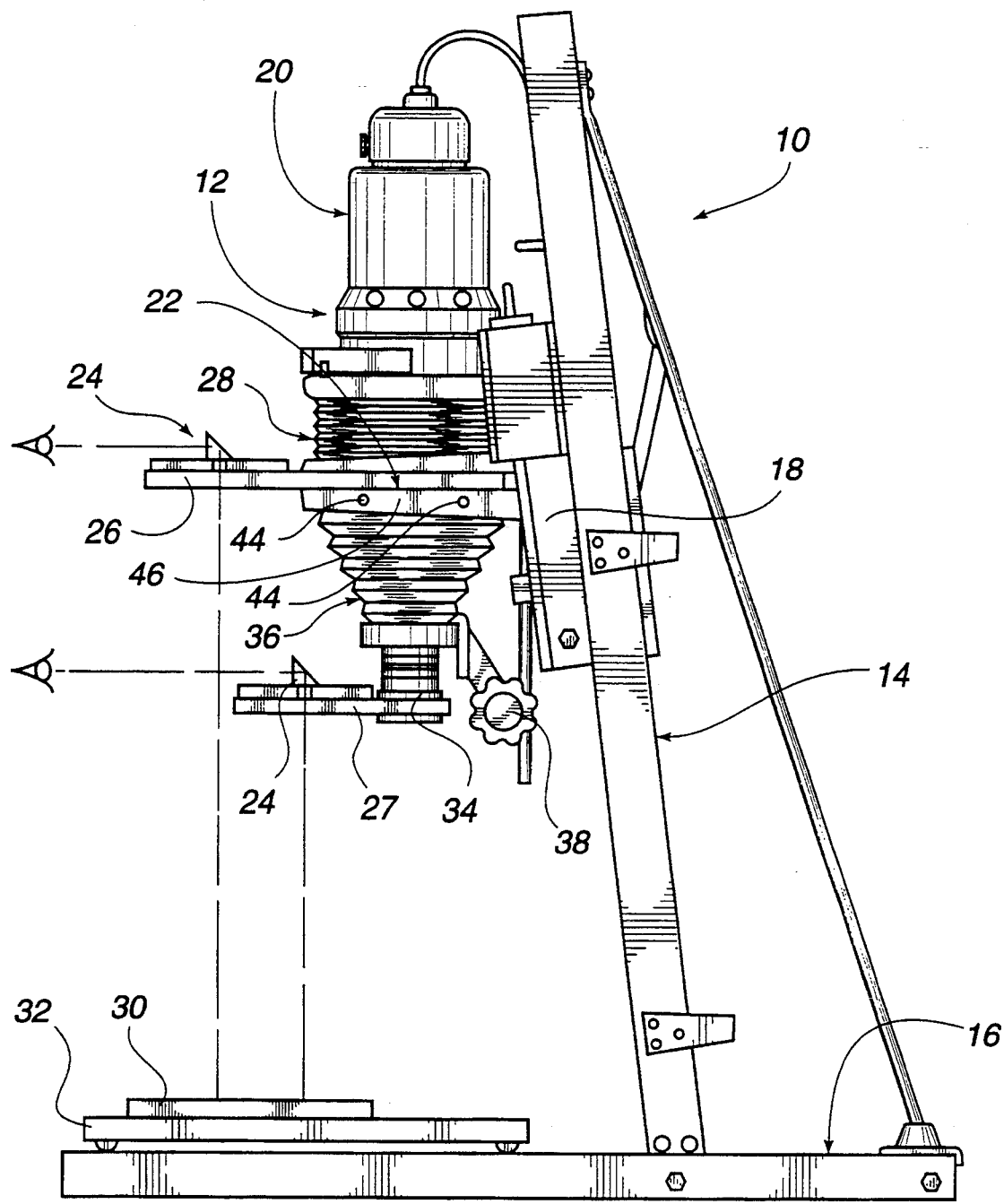
FIG. 1 is side elevation view showing prior art optical alignment apparatus installed in prior art photographic enlarger apparatus.

As discussed above, the present invention is designed to be cooperative with optical alignment apparatus for facilitating alignment of principal planes in a photographic enlarger. Such apparatus is described in detail in U.S. Pat. No. 5,075,862, the complete disclosure of which is hereby incorporated by reference. Principal components of such apparatus, installed in a photographic enlarging apparatus, are depicted in FIG. 1. Here, an enlarger 10 includes an enlarger head 12 attached to a frame 14 which is mounted on a base 16. A head carrier 18 is provided for moving enlarger head 12 up and down on frame 14. Enlarger 10 is generally representative of a type "D5" enlarger available from the Omega-Arkay Company.

Enlarger head 12 includes a lamp housing 20, including a lamp (not shown) which provides a source of light for illuminating a photographic negative (not shown). The negative would normally be placed on a negative platform 22 which, as explained further below, is not readily adjustable.

For aligning such apparatus, optical alignment apparatus 24 may be mounted on a transparent plate 26 which is inserted between a bellows extension 28 of lamp housing 20, and negative platform 22. The optical alignment apparatus 24 is cooperative with a mirror which rests on a easel 32. The easel rests, in turn, on base 16. For completeness it is pointed out that optical apparatus 24 may also be attached to a lens stage 34 by means of a transparent plate 27 attached to the lens stage. Once the desired planes have been aligned, the optical apparatus may be removed and a negative placed on negative platform 22 for projection.

Figure 1A:
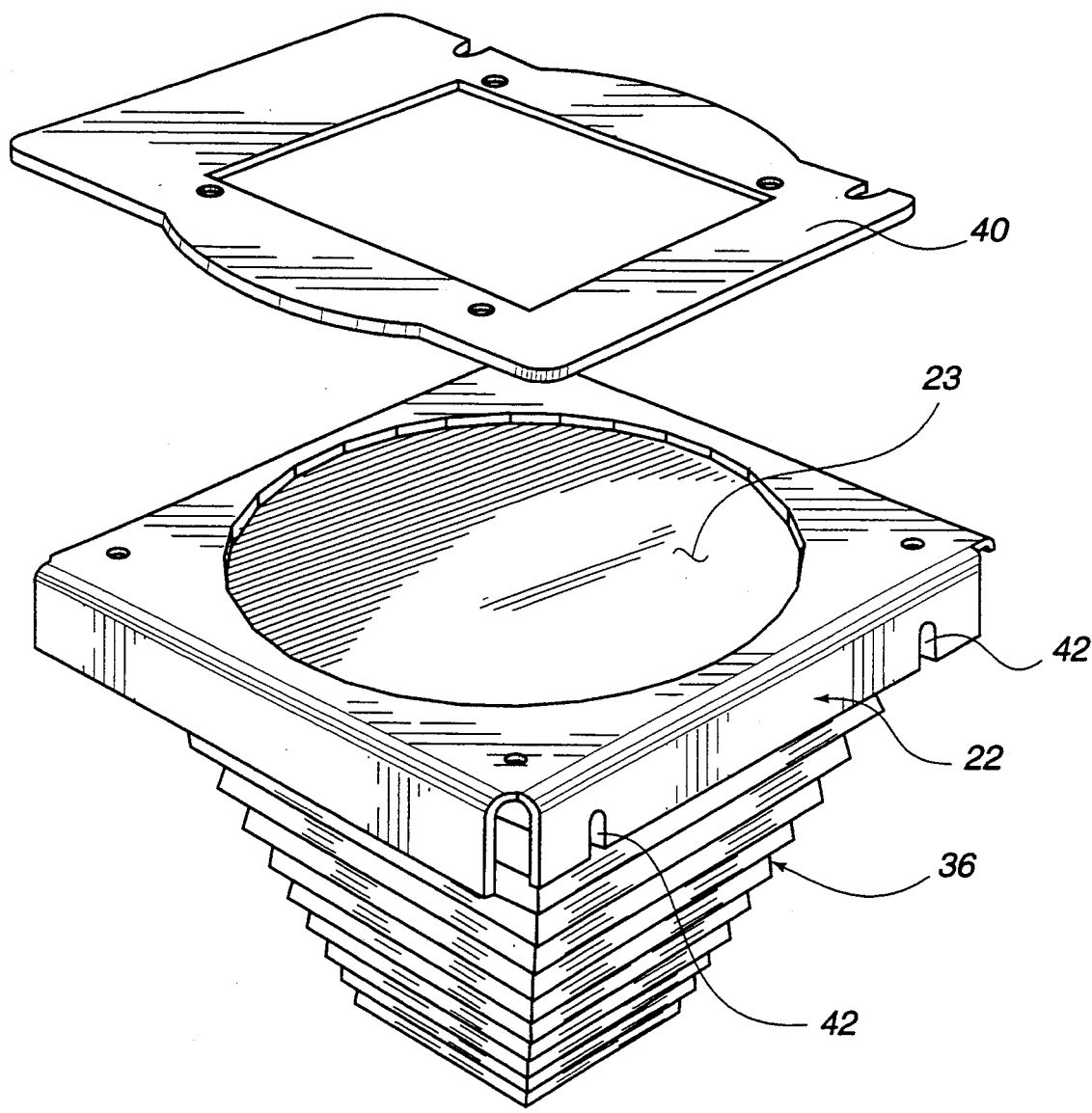
FIG. 1A is an exploded perspective view showing a prior art negative platform and a negative holder for the enlarger apparatus of FIG. 1

Referring now to FIG. 1A, negative platform 22 is usually attached directly to a bellows unit 36, extending between the negative platform and lens stage 34. Bellows unit 36 permits vertical lens travel, for focussing, and is adjusted by a knob 38 (see FIG. 1). An aperture 23 in negative platform 22 permits light from lamp housing 20 to pass through the platform to the lens stage.

Referring again to FIG. 1A, typically, a negative to be reproduced is placed on a negative holder 40 and held in position on the holder by a similar holder (not shown), which effectively clamps the negative, by its edges, between the two holders.

Continuing with reference to FIG. 1A and again to FIG. 1, in the type "D5" enlarger, a negative platform 22 is provided with slots 42 which are used in combination with screws 44 (see FIG. 1) to attach the platform (and attached bellows unit 36) to arms 46, (only one visible in FIG. 1) which extend from head carrier 18. The slots are included to provide some measure of adjustability for negative platform 22, primarily for coarse alignment of the platform by the manufacturer. It will be evident, however, to those familiar with the photographic art, that it may be very difficult to perform fine alignment when screws 44 must be loosened, and platform 22 manually pushed and pulled on arms 46 to do so.

Further, if fine alignment is eventually obtained by such a clumsy process, it is often lost when screws 44 are re-tightened to clamp platform 22 in position as, due to the re-tightening, the platform is often warped and twisted. If the platform is thus warped and twisted, there is no guarantee that a negative holder placed thereon will lie in the same orientation as plate 26 of the optical alignment apparatus initially used to determine alignment.

Referring now to FIGS. 2, 3, 4, and 5, one preferred embodiment 50 of an alignable negative stage in accordance with the present invention is illustrated. This particular embodiment is designed as an accessory for a "D5" type enlager or the like. It is configured for mounting over existing negative platform 22 in enlarger 10.

Principal features of the embodiment include a generally flat lower platform 52 and a generally flat upper platform 54. Apertures 56 and 58 in respectively lower and upper platforms 52 and 54 are aligned with each other. This allows passage of light therethrough from the light source in lamp housing 20 of enlarger head 12. When negative stage 50 is installed in enlarger 10, apertures 56 and 58 are, in turn, aligned with aperture 23 in negative platform 22.

Figure 2:
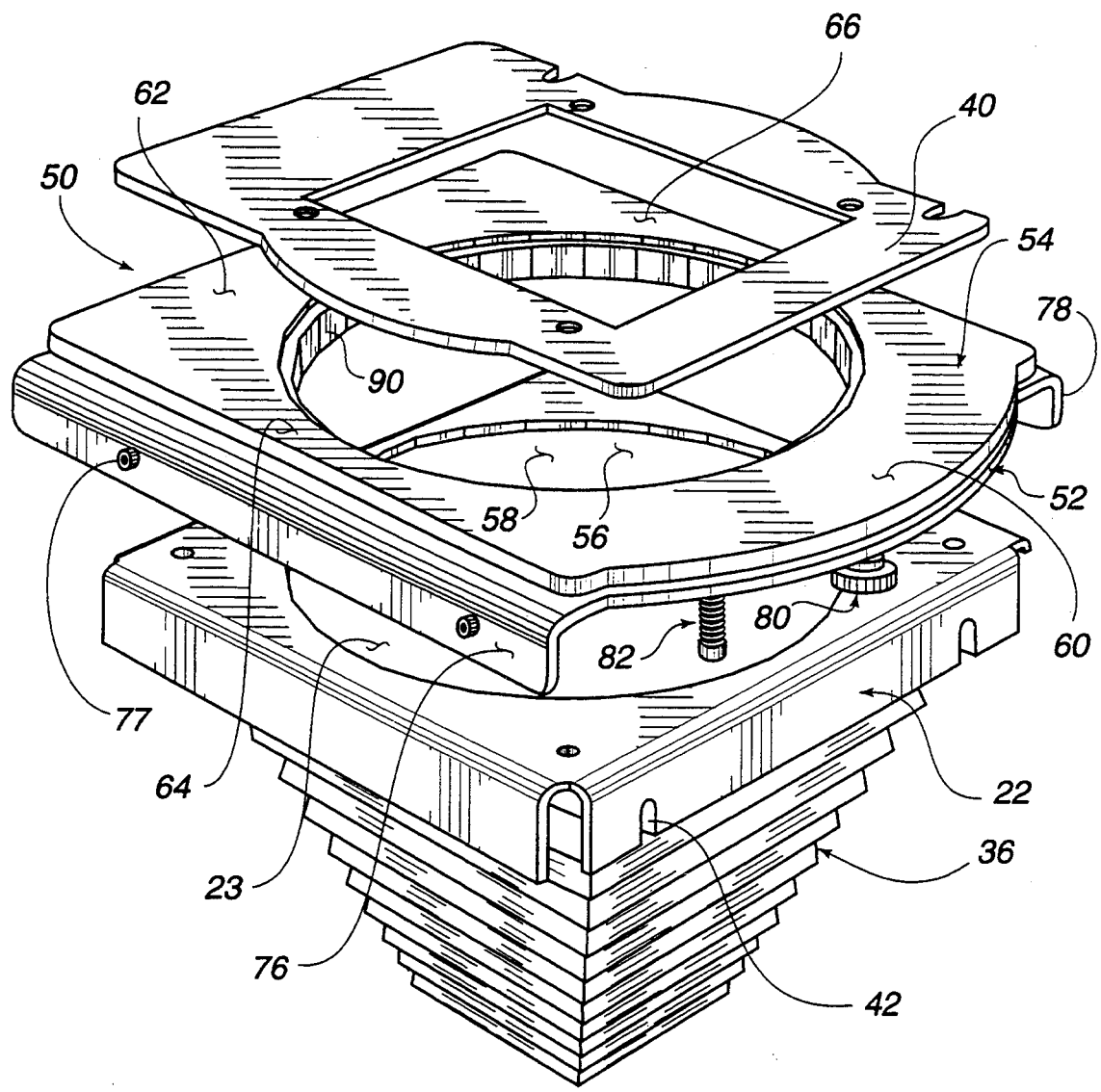
FIG. 2 is an exploded perspective view from above schematically illustrating one preferred embodiment of an alignable negative stage in accordance with the present invention together with cooperative components of the enlarger apparatus of FIG. 1.
Figure 4:
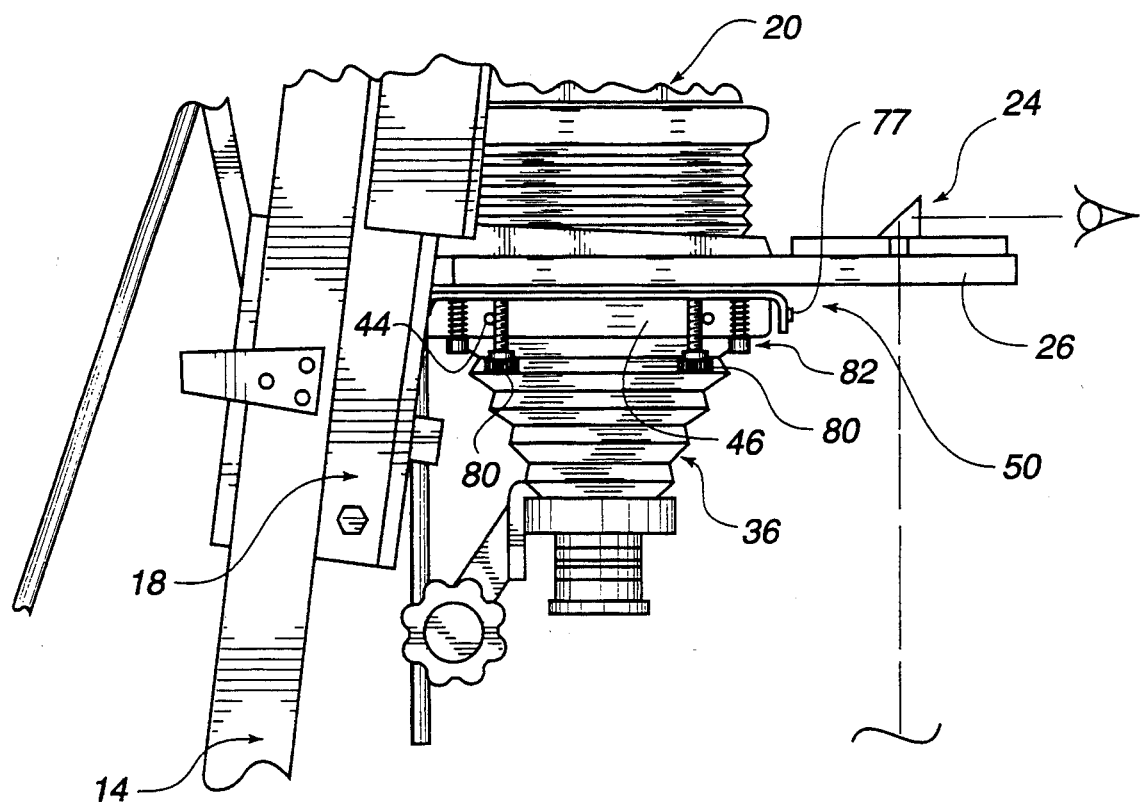
FIG. 4 is a fragmentary side elevation view schematically illustrating the negative stage of FIG. 2 installed in the photographic enlarger of FIG. 1 together with optical alignment apparatus depicted in FIG. 1.
Figure 5:
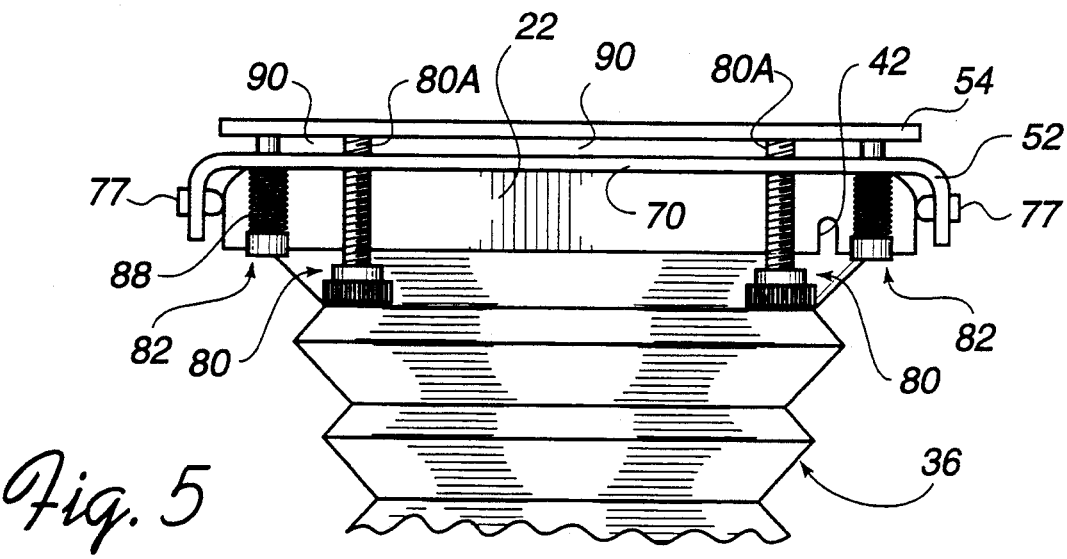
FIG. 5 is a fragmentary side elevation view schematically illustrating the negative stage of FIG. 2 installed in the photographic enlarger of FIG. 1 and illustrating means for securing the negative stage in position on the apparatus.

Lower and upper platforms 52 an 54 are preferably generally rectangular, with one end thereof slightly rounded. Upper platform 54 preferably has a length between ends 60 and 62 of about 8.25 inches and a width between sides 64 and 66 of about 8.0 inches. Apertures 56 and 58 preferably have a diameter of about 6.0 inches. Referring to FIG. 2, lower platform 52 preferably also has a length of about 8.25 inches between ends 68 and 70 and a width between sides 72 and 74 of about 8.0 inches. In this respect, the platforms have generally the same rectangular dimensions. Lower platform 52, however, preferably includes downwardly extending flange portions 76 and 78 on side 72 and 74 respectively. The flange portions are provided with threaded apertures 75, through which mating screws 77 may be inserted on at least one side. Screws 77 may be used to secure lower platform 52 to negative platform 22 of enlarger 10 as illustrated in FIGS. 4 and 5. It should be noted that in FIG. 5 arms 46 have been omitted for clarity.

The upper and lower platforms are preferably manufactured from aluminum, the lower platform preferably having a thickness of about one-eighth of an inch, and the upper platform preferably having a thickness of about three-sixteenths of an inch. As is prudent with most darkroom apparatus, it is preferable that upper and lower platforms 54 and 52, and all other major components of negative stage 50 described below, are finished in a matt-black finish Continuing now with reference to FIGS. 2, 3, 4, 5, and 6, upper and lower platforms 52 and 54 are aligned in a generally face-to-face relationship. The platforms are preferably spaced apart by at least three support-members, at least two, and preferably three of which are extendable in a direction generally perpendicular to the platforms for adjusting spacing and alignment of the platforms relative to each other. In this preferred embodiment of the present invention, three such extendable support-members are provided by three adjusting screws 80.

It will be evident to those familiar with the art that while, in theory at least, four or more support members may be provided, any number greater than three will complicate, rather than facilitate, the alignment process.

Figure 6:
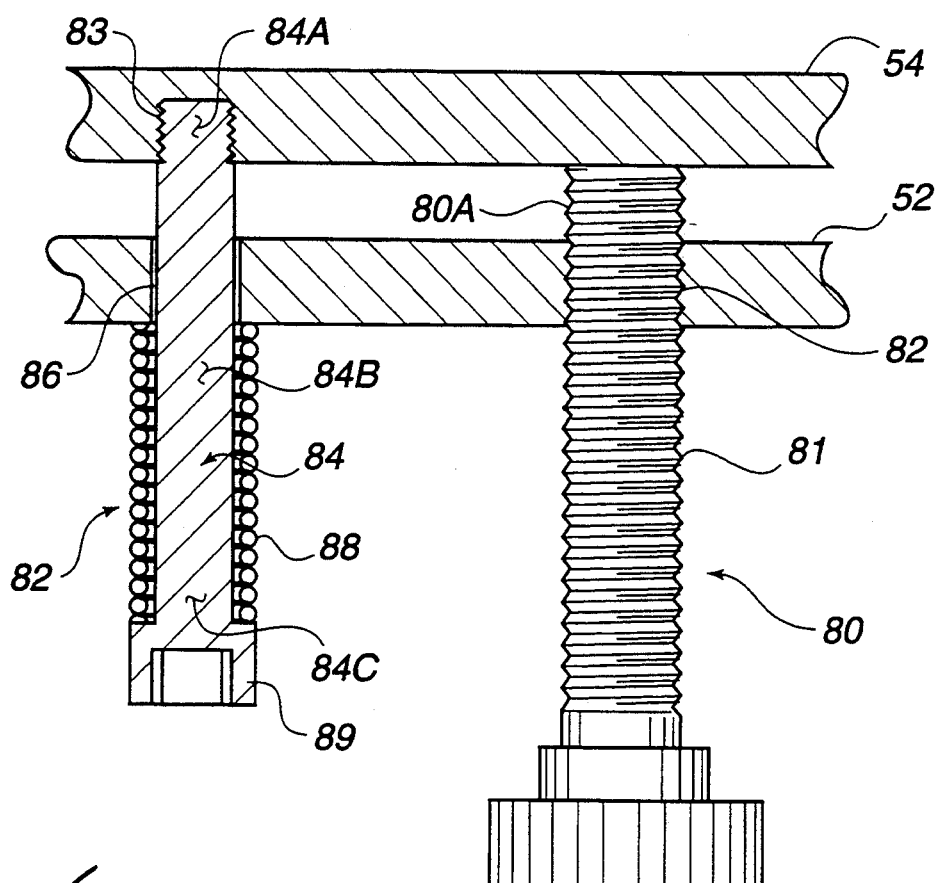
FIG. 6 is a cross-section view seen generally in the direction 6—6 of FIG. 3 schematically illustrating detail of the arrangement of adjusting screws and spring loading shafts in the negative stage of FIG. 2.

Adjusting screws 80 extend through lower platform 52, in a direction generally perpendicular thereto, via mating threaded apertures 82 therein (see FIG. 6). Upper portions 80A of the screws form the support-members. The screws are simply turned to extend or retract the support-members in a direction generally perpendicular to lower platform 52.

Figure 3:
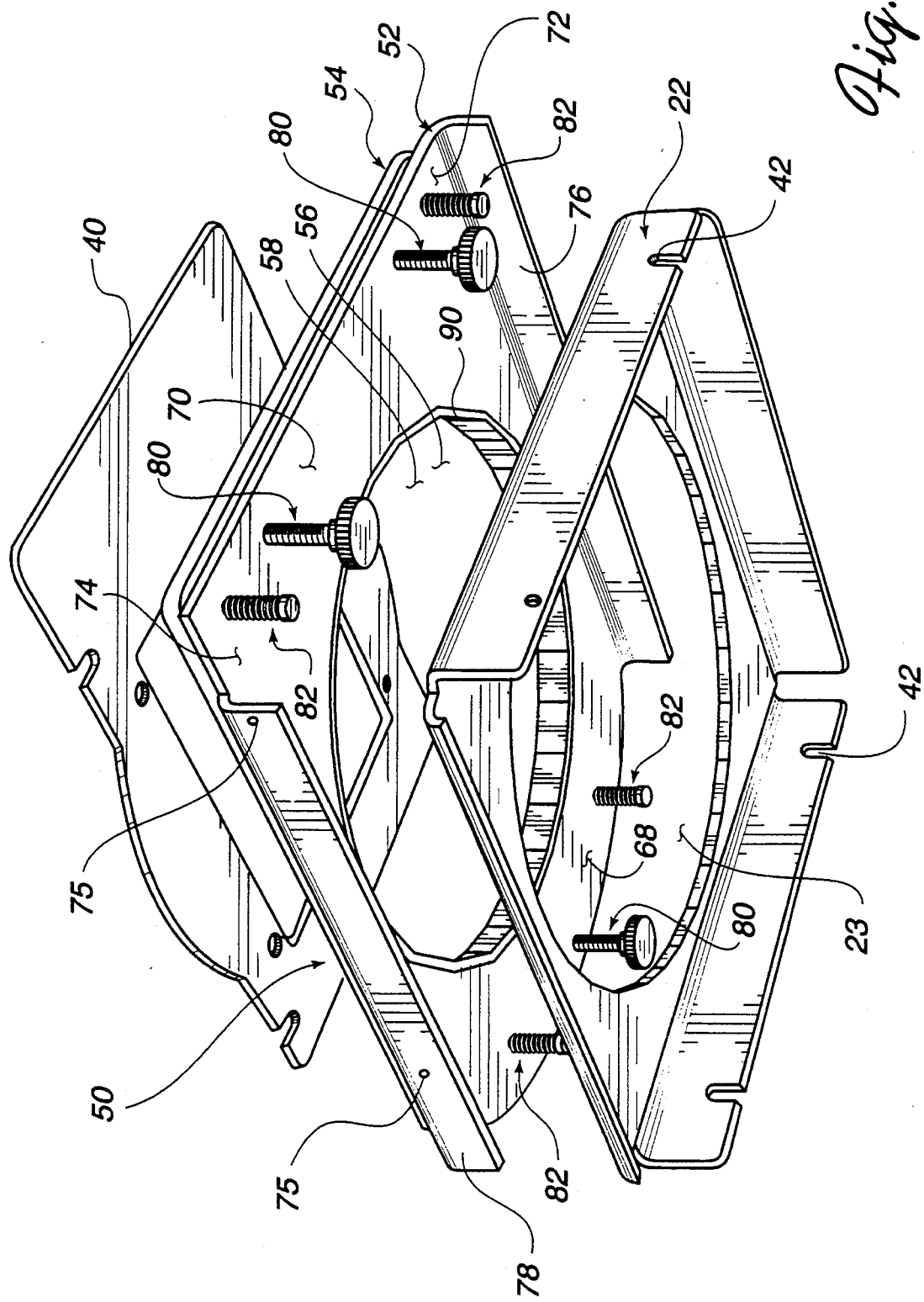
FIG. 3 is an exploded perspective view from below schematically illustrating the negative stage of FIG. 2 together with cooperative components of the enlarger apparatus of FIG. 1.

The adjusting screws 80 are preferably arranged, essentially at the corners of a triangle, with two thereof proximate end 70, and one thereof proximate end 68 of lower platform 52 (se FIG. 3). Negative stage 50 is arranged to be installed in enlarger 10 with end 70 of lower platform 52 overhanging negative platform 22 and to the left of a user. When negative stage 50 is installed in this way, two adjusting screws 80 are accessible to a user (see FIG. 5). These two adjusting screws (and the third if necessary) are used to adjust the relative inclination and spacing of upper and lower platforms 54 and 52.

Means are preferably provided for maintaining upper platform 54 in contact with support member portions 80A of adjusting screws 80. A convenient arrangement includes a plurality of spring loaded plungers 82 (see FIG. 3). At least three such plungers are required, with four being a preferred number. They are preferably arranged with a first two thereof located proximate end 62 of upper platform 54, and a second two thereof proximate end 60 of upper platform 54.

Referring to FIG. 6 for detail, a preferred embodiment of a plunger 82 includes a shaft 84 attached at one end 84A thereof to upper platform 54. Preferably, shaft 84 is the shaft of a screw which is screwed into a mating threaded aperture 83 in upper platform 54. Shaft 84 extends from the upper platform, in a direction generally perpendicular thereto, through a corresponding clear aperture 86 in lower platform 52, such that lower portion 84B of shaft 84 extends below the platform. A coil spring 88 is arranged axially around lower portion 84B of shaft 84, and is maintained in compression against lower platform 52 by means at end 84C of shaft 84, conveniently provided here by screw head 89.

Force provided by coil springs 88 not only provides the force necessary to maintain upper platform 54 in contact with adjusting screws 80, but also maintains screw threads 81 of adjusting screws 80 in tight contact with mating threaded apertures 82. Because of this, both upper and lower platforms 54 and 52 are maintained in tight contact with adjusting screws 80, i.e., in contact with the support-members.

As upper and lower platforms 54 and 52 are generally spaced apart during use, a baffle arrangement is preferably provided to prevent leakage of light between the platforms, i.e., in a direction parallel to the plane of the platforms. The baffle arrangement thus prevents light from escape into a darkroom in which enlarger 10 is located, possibly causing fogging of photographic materials in the dark room, or even a print instantly being exposed in the enlarger.

Figure 7:
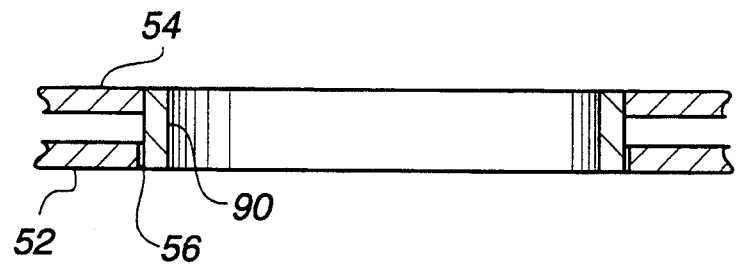
FIG. 7 is a cross-section view seen generally in the direction 7—7 of FIG. 2 schematically illustrating a baffle arrangement in the negative stage of FIG. 2.

Referring now to FIG. 7, one preferred baffle arrangement includes a baffle-ring 90 attached to upper platform 54 and tightly encircling aperture 58 therein. Aperture 56 in lower platform 52 has a slightly larger diameter than aperture 58, sufficiently large that baffle-ring 90 may extend downwards from upper platform 54 into aperture 56 in lower platform 52. The difference in diameters should be sufficient that there is a clearance of about about one millimeter between baffle ring 90 and aperture 56. This is sufficient to allow unhampered relative movement between the platforms without compromising light-baffling effectiveness.

Figure 8:
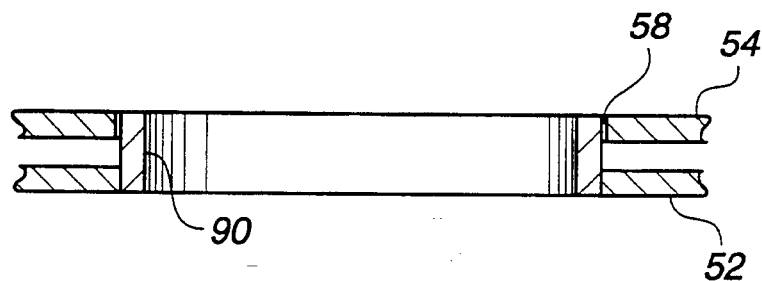
FIGS. 8 and 9 are cross-section views depicting alternate arrangements of baffles in a negative stage in accordance with the present invention.
Figure 9:
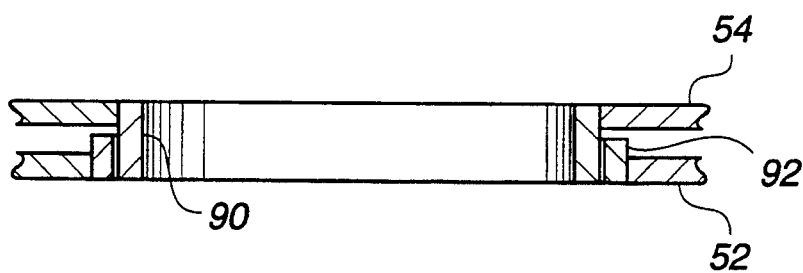

Alternatively, as illustrated in FIG. 8, aperture 58 may have a diameter greater than the diameter of aperture 56, and baffle-ring 90 may extend from lower platform 52 into aperture 58 in upper platform 54. Clearly, in either of the above-described arrangements, baffle-ring 90 should not extend above upper platform 54 or below lower platform 52, otherwise it will interfere with seating of negative stage 50 on negative platform 22, or with seating of negative holder 40 on upper platform 54.

A third, non-exhaustive, baffle arrangement may include a baffle-rings 90 and 92 attached respectively to upper and lower platforms 54 and 52, with baffle-ring 90 arranged to fit within baffle-ring 92. This arrangement provides a greater range of spacing between the upper and lower platforms while still providing effective light-baffling.

Figure 10:
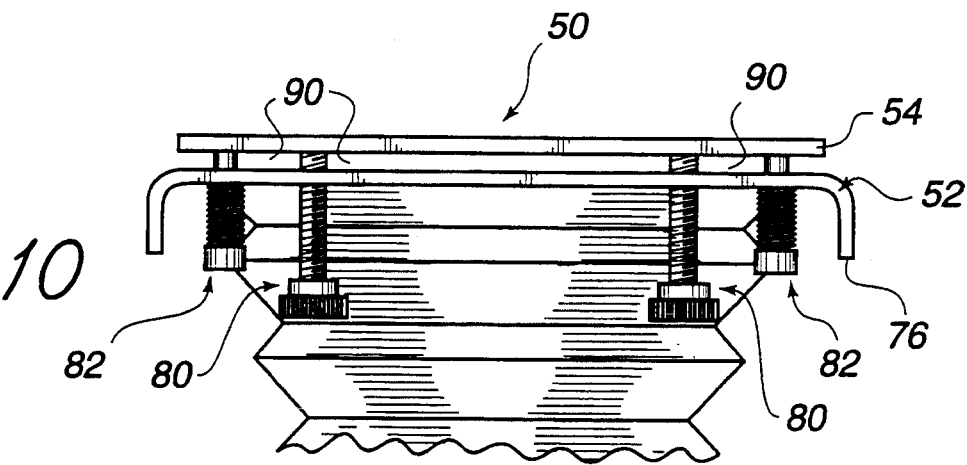
FIG. 10 is a fragmentary side elevation view schematically illustrating one method of installing the negative stage of FIG. 2 as an integral part of a photographic enlarger of the type depicted in FIG. 1.

Referring to FIG. 10, it is pointed out that while negative stage 50 has been described above as an accessory device which may be easily installed in and removed from a existing enlarger, it may also be installed by an enlarger manufacturer as an original-equipment alignable negative stage. This may be accomplished simply by dispensing with the conventional negative platform 22 and, in its stead, attaching lower platform 52 of negative stage 50 directly to bellows unit 36.

In summary, an alignable negative stage for a photographic enlarger apparatus has been described. The negative stage is designed to be cooperative with optical alignment apparatus for aligning principle planes of the enlarging apparatus. A negative to be enlarged rests on an upper platform which is adjustably supported on a lower platform by adjustable support-members. The upper platform is moveable against restraint of a spring loaded system for maintaining both platforms in contact with the support-members.

The spring-loaded support system, or "floating-support" system, has been found effective in maintaining a flat upper platform for the negative, both during and after alignment. Because of this, there is a high degree of certainty that the negative, when placed on the platform, will lie thereon in the same alignment as an optical alignment apparatus which had been used to align the negative stage.

While principles of the invention have been described with reference to a particular enlarger type, the description given above will enable those skilled in the art to devise embodiments of the invention which are adaptable to enlarger types other than the type described.

The present invention has been described in terms of a preferred embodiment and a number of other embodiments. The invention however is not limited to the embodiments described and depicted. Rather, the scope of the invention is defined by the appended claims.

What is claimed is:

1. A negative stage for a photographic enlarger comprising:
    a generally flat lower platform and a generally flat upper platform, each of said platforms having an aperture therein for allowing passage of light therethrough from a light source in the enlarger, and said upper platform arranged for supporting a photographic negative holder thereon;
    said platforms aligned in a face-to-face relationship with said apertures therein generally in alignment, said platforms spaced apart by at least three adjusting screws, said adjusting screws extending generally perpendicularly through said lower platform via mating threaded apertures therein, at least two of said adjusting screws extendable in a direction generally perpendicular to said platforms for adjusting inclination of said platforms with respect to each other;
    spring loading means for maintaining said platforms in contact with said adjusting screws; and
    said adjusting screws and said spring loading means arranged such that said inclination of the platforms with respect to each other may be adjusted by turning only said at least two adjusting screws.

2. The negative stage of claim 1, further including light-baffle means arranged around said apertures and extending between said platforms for preventing leakage of the light therebetween.

3. A negative stage for a photographic enlarger, comprising:
    a generally flat lower platform and a generally flat upper platform, each of said platforms having an aperture therein for allowing passage of light therethrough from a light source in the enlarger, and said upper platform arranged for supporting a photographic negative holder thereon;
    said platforms aligned in a face-to-face relationship with said apertures therein generally in alignment, and said platforms spaced apart by three adjusting screws for adjusting relative spacing and alignment of said platforms, each of said adjusting screws extending generally perpendicularly through said lower platform via a mating threaded apertures therein;
    spring loading means for maintaining said platforms in contact with said adjusting screws, said spring loading means including at least three shafts, each thereof having first and second ends, each of said shafts attached at the first end thereof to said upper platform and extending freely through said lower platform via a corresponding aperture therein such that a lower portion of said shaft extends below said lower platform, and each of said shafts having a coil spring arranged axially around the lower portion thereof, and having means at the second end thereof for maintaining said coil spring in compression against said lower platform; and
    said adjusting screws and said spring loading means arranged such that said inclination of the platforms with respect to each other may be adjusted by turning only said adjusting screws.

4. The negative stage of claim 3, wherein said platforms are each generally rectangular and of about the same rectangular dimensions, each thereof having two opposite generally straight sides, and first and second ends, and said at least three adjusting screws arranged such that two thereof are proximate the first end of said lower platform and one thereof is proximate the second end of said lower platform.

5. The negative stage of claim 4, wherein said spring loading means includes four shafts, a first two thereof attached to said upper platform proximate the first end thereof, and a second two thereof attached to said upper platform proximate the second end thereof.

6. The negative stage of claim 5, wherein each of said straight sides includes a downwardly extending flange portion, and at least one of said flange portions includes means for securing said lower platform to the photographic enlarger.

7. The negative stage of claim 3 wherein said light-passage-allowing apertures in said upper and lower platforms are generally circular and said aperture in said lower platform has a larger diameter than said aperture in said upper platform, and said light-baffle means includes a light-baffle-ring encircling said aperture in said upper platform and extending freely into said aperture in said lower platform.

8. The negative stage of claim 3, wherein said light-light-passage-allowing apertures in said upper and lower platforms are generally circular and said aperture in said upper platform has a larger diameter than said aperture in said lower platform, and said light-baffle means includes a light-baffle-ring encircling said aperture in said lower platform and extending freely into said aperture in said upper platform.

9. In a photographic enlarger including a negative stage for supporting a photographic negative, the invention characterized in that the negative stage comprises:
    a generally flat lower platform and a generally flat upper platform, each of said platforms having an aperture therein for allowing passage of light therethrough from a light source in the enlarger, and said upper platform arranged for supporting the photographic negative holder thereon;
    said platforms aligned in a face to face relationship with said apertures generally in alignment, said platforms spaced apart by at least three adjusting screws, said adjusting screws extending generally perpendicularly through said lower platform via mating threaded apertures therein, at least two of said adjusting screws moveable in a direction generally perpendicular to said platforms for adjusting relative inclination of said platforms with respect to each other;

spring loading means for maintaining said platforms in contact with said adjusting screws; and said adjusting screws and said spring loading means arranged such that said inclination of the platforms with respect to each other may be adjusted by turning only said at least two adjusting screws.

10. The photographic enlarger of claim 9, wherein said negative stage further includes light-baffle means arranged around said apertures and extending between said platforms for preventing leakage of the light therebetween.

11. The photographic enlarger of claim 9, wherein said spring loading means includes at least three shafts each having first and second ends, each of said shafts attached at the first end thereof to said upper platform and extending freely through said lower platform via a corresponding aperture therein such that a lower portion of said shaft extends below said lower platform, each of said shafts having a coil spring arranged axially around said lower portion thereof, and having means at the second end thereof for maintaining said coil spring in compression against said lower platform.

* * * * *